US012798987B2

(12) United States Patent
Chou et al.

(10) Patent No.: US 12,798,987 B2
(45) Date of Patent: Nov. 17, 2026

(54) COPPER OXIDE NANOPOWDER AND METHOD OF FORMING THE SAME AND ELECTRICALLY INSULATING AND THERMALLY CONDUCTIVE FILM

(71) Applicant: INDUSTRIAL TECHNOLOGY RESEARCH INSTITUTE, Hsinchu (TW)

(72) Inventors: Yu-Hsien Chou, Tainan City (TW); Li-Shing Chou, Tainan City (TW); Chi-San Chen, Kaohsiung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 445 days.

(21) Appl. No.: 18/512,238

(22) Filed: Nov. 17, 2023

(65) Prior Publication Data

US 2025/0162032 A1 May 22, 2025

(51) Int. Cl.
*C01G 3/02* (2006.01)
*B82Y 30/00* (2011.01)
*B82Y 40/00* (2011.01)

(52) U.S. Cl.
CPC ................ *C01G 3/02* (2013.01); *B82Y 30/00* (2013.01); *B82Y 40/00* (2013.01)

(58) Field of Classification Search
CPC ............ C01G 3/02; B82Y 30/00; B82Y 40/00
See application file for complete search history.

(56) References Cited

U.S. PATENT DOCUMENTS

| | | | |
|---|---|---|---|
| 9,700,961 | B2 | 7/2017 | Kitahara |
| 2003/0146498 | A1 | 8/2003 | Kondo et al. |
| 2020/0232156 | A1 | 7/2020 | Zhang et al. |

FOREIGN PATENT DOCUMENTS

| | | | | |
|---|---|---|---|---|
| CN | 100443414 C | 12/2008 | | |
| CN | 103496731 A | 1/2014 | | |
| CN | 104528801 A | 4/2015 | | |
| CN | 105858709 A | 8/2016 | | |
| CN | 109621957 A | * 4/2019 | ............. | B01J 23/72 |
| CN | 110564254 A | 12/2019 | | |
| CN | 111892078 A | 11/2020 | | |
| CN | 112093816 A | 12/2020 | | |
| CN | 112279291 A | 1/2021 | | |
| CN | 112430410 A | 3/2021 | | |
| CN | 113913066 A | 1/2022 | | |
| CN | 113955795 A | 1/2022 | | |
| CN | 116487826 A | 7/2023 | | |
| JP | WO 2017/111115 A1 | 6/2017 | | |
| TW | 200911973 A | 3/2009 | | |
| TW | 201020214 A | 6/2010 | | |

OTHER PUBLICATIONS

Buarod et al (Facile synthesis and characterization of tenorite nanoparticles from gas-atomized Cu powder, Powder Technology, 2015) (Year: 2015).*
Phiwdang (Synthesis of CuO Nanoparticles by Precipitation Method Using Different Precursors, Energy Procedia, 2013) (Year: 2013).*
Machine Translation of CN-109621957-A (Year: 2019).*
Singh et al., "A Brief Review on Synthesis and Characterization of Copper Oxide Nanoparticles and its Applications," Journal of Bioelectronics and Nanotechnology, vol. 1, No. 1, Jun. 2016, pp. 1-9.
Taiwanese Office Action and Search Report for Taiwanese Application No. 112144434, dated Aug. 1, 2024.
Wongpisutpaisan et al., "Sonochemical Synthesis and Characterization of Copper Oxide Nanoparticles," 9th Eco-Energy and Materials Science and Engineering Symposium, Energy Procedia 9, Elsevier, 2011, pp. 404-409.

* cited by examiner

*Primary Examiner* — Anthony J Zimmer
*Assistant Examiner* — Logan Laclair
(74) *Attorney, Agent, or Firm* — Birch, Stewart, Kolasch & Birch, LLP

(57) ABSTRACT

A method of forming copper oxide nanopowder includes dissolving copper metal bulk in an acidic solution to form a copper-containing solution, wherein the acidic solution is sulfuric acid or nitric acid. The method includes adding an alkaline solution into the copper-containing solution to precipitate a solid. The method includes filtering, collecting, and drying the solid. The method includes calcinating the solid to obtain copper oxide nanopowder. When the acidic solution is sulfuric acid, the copper oxide nanopowder is a combination of long-bar shaped and sheet-shaped. When the acidic solution is nitric acid, the copper oxide nanopowder is short-bar shaped. The copper oxide nanopowder and an aqueous resin can be mixed to form an electrically insulating and thermally conductive film.

4 Claims, No Drawings

COPPER OXIDE NANOPOWDER AND METHOD OF FORMING THE SAME AND ELECTRICALLY INSULATING AND THERMALLY CONDUCTIVE FILM

TECHNICAL FIELD

The technical field relates to copper oxide nanopowder, and relates to an electrically insulating and thermally conductive film containing the copper oxide nanopowder.

BACKGROUND

The commercially available non-conductive die attach film (ncDAF) material is formed by mixing alumina micro powder (doped with trace amount of silica micro powder) and resin. Conventional ncDAF has poor thermal conductivity (<1 W/m*K), and it cannot efficiently lower the thermal resistance that is internally generated after IC packaging. As such, the ncDAF can only be applied in wire bonding packaging, lead frame packaging, and small- and medium-sized chip packaging, thereby greatly limiting the ncDAF that can be used in packaging industries such as network transmission communications, internet of things, wearable product applications, home appliance integration, and vehicle communications. Accordingly, a method of enhancing the thermal conductivity of the ncDAF material as well as reducing the thickness of the ncDAF material is called for.

SUMMARY

One embodiment of the disclosure provides a method of forming copper oxide nanopowder. The method includes dissolving copper metal bulk in an acidic solution to form a copper-containing solution. The acidic solution includes sulfuric acid or nitric acid. The method includes adding an alkaline solution into the copper-containing solution to precipitate a solid. The method includes filtering, collecting, and drying the solid. The method includes calcinating the solid to obtain copper oxide nanopowder. When the acidic solution is sulfuric acid, the copper oxide nanopowder is a combination of long-bar shaped and sheet-shaped. When the acidic solution is nitric acid, the copper oxide nanopowder is short-bar shaped.

In some embodiments, the long-bar shaped copper oxide nanopowder has a length-to-diameter ratio of 25 to 100 and a diameter of 50 nm to 200 nm.

In some embodiments, the sheet-shaped copper oxide nanopowder has a length-to-thickness ratio of 25 to 100 and a thickness of 50 nm to 200 nm.

In some embodiments, the short-bar shaped copper oxide nanopowder has a length-to-diameter ratio of 5 to 20 and a diameter of 50 nm to 200 nm.

In some embodiments, the alkaline solution is 0.05 M to 0.5 M of sodium hydroxide solution.

One embodiment of the disclosure provides a copper oxide nanopowder, being short-bar shaped or a combination of long-bar shaped and sheet-shaped.

In some embodiments, the long-bar shaped copper oxide nanopowder has a length-to-diameter ratio of 25 to 100 and a diameter of 50 nm to 200 nm.

In some embodiments, the sheet-shaped copper oxide nanopowder has a length-to-thickness ratio of 25 to 100 and a thickness of 50 nm to 200 nm.

In some embodiments, the short-bar shaped copper oxide nanopowder has a length-to-diameter ratio of 5 to 20 and a diameter of 50 nm to 200 nm.

One embodiment of the disclosure provides an electrically insulating and thermally conductive film, including: an aqueous resin and the described copper oxide nanopowder, wherein the aqueous resin includes 100 parts by weight of an epoxy resin; 2 to 7 parts by weight of a vinyl silane; and 1 to 2 parts by weight of polyethylene glycol, wherein the aqueous resin and the copper oxide nanopowder have a weight ratio of 20:80 to 18:82.

In some embodiments, the polyethylene glycol has a weight average molecular weight of 300 to 600.

In some embodiments, the electrically insulating and thermally conductive film has a thickness of 8 micrometers to 15 micrometers.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of forming copper oxide nanopowder, including dissolving copper metal bulk in an acidic solution to form a copper-containing solution. The acidic solution includes sulfuric acid or nitric acid. In general, the copper-containing solution contains 0.5 wt % to 1 wt % of copper. If the copper concentration of the copper-containing solution is too low, the obtained copper oxide nanopowder will be too less. If the copper concentration of the copper-containing solution is too high, the copper oxide nanopowder will have a non-uniform diameter distribution and an overly large diameter. In addition, directly dissolving the copper metal bulk in the acidic solution (rather than dissolving copper salt in water) is beneficial to reduce the cost.

Subsequently, an alkaline solution is added into the copper-containing solution to precipitate a solid. The solid is filtered, collected, and dried. The dried solid is calcinated to obtain copper oxide nanopowder. In some embodiments, the alkaline solution is 0.05 M to 0.5 M of sodium hydroxide solution, such as 0.1 M of sodium hydroxide solution. If the concentration of the alkaline solution is too low, it will be difficult to precipitate the copper oxide nanopowder. If the concentration of the alkaline solution is too high, the copper oxide nanopowder will have a non-uniform diameter distribution and an overly large diameter.

In some embodiments, the acidic solution is sulfuric acid, and the copper oxide nanopowder is a combination of long-bar shaped and sheet-shaped. In some embodiments, the long-bar shaped copper oxide nanopowder has a length-to-diameter ratio of 25 to 100 and a diameter of 50 nm to 200 nm. If the length-to-diameter ratio is too less, the contact surface of the powder will be reduced to lower the thermal conductivity. If the length-to-diameter ratio is too large, the powder will be easily tangled to each other and difficult to be dispersed. If the diameter is too small, the powder will be easily aggregated and difficult to be dispersed. If the diameter is too large, the solid content of the powder added into an aqueous resin will be lowered. In some embodiments, the sheet shaped copper oxide nanopowder has a length-to-thickness ratio of 25 to 100 and a thickness of 50 nm to 200 nm. If the length-to-thickness ratio is too less, the contact surface of the powder will be reduced to lower the thermal conductivity. If the length-to-thickness ratio is too large, the powder will be easily tangled to each other and difficult to be dispersed. If the thickness is too small, the powder will be easily aggregated and difficult to be dispersed. If the thickness is too large, the solid content of the powder added into an aqueous resin will be lowered.

In some embodiments, the acidic solution is nitric acid, and the copper oxide nanopowder is short-bar shaped. The short-bar shaped copper oxide nanopowder has a length-to-diameter ratio of 5 to 20 and a diameter of 50 nm to 200 nm. If the length-to-diameter ratio is too less, the contact surface of the powder will be reduced to lower the thermal conductivity. If the length-to-diameter ratio is too large, the powder will be easily tangled to each other and difficult to be dispersed. If the diameter is too small, the powder will be easily aggregated and difficult to be dispersed. If the diameter is too large, the solid content of the powder added into an aqueous resin will be lowered.

If the acidic solution is hydrochloric acid, the copper oxide nanopowder is ball-shaped. The ball-shaped copper oxide nanopowder has a length-to-diameter ratio of 0.8 to 1 and a diameter of 30 nm to 60 nm. In general, the ball-shaped copper oxide nanopowder cannot be used in an electrically insulating and thermally conductive film.

One embodiment of the disclosure provides the copper oxide nanopowder, such as the short-bar shaped or the combination of the long-bar shaped and sheet-shaped, for being used in an electrically insulating and thermally conductive film. In some embodiments, the electrically insulating and thermally conductive film includes an aqueous resin and the copper oxide nanopowder (e.g. the short-bar shaped copper oxide nanopowder, or the combination of the long-bar shaped and sheet-shaped copper oxide nanopowder). The aqueous resin includes 100 parts by weight of an epoxy resin, 2 to 7 parts by weight of vinyl silane, and 1 to 2 parts by weight of polyethylene glycol. If the vinyl silane amount is too low, the compatibility of the copper oxide nanopowder and the aqueous resin will be degraded, and cracks will be easily occurred in the interface therebetween. If the vinyl silane amount is too high, the thermal conductivity will be lowered. If the polyethylene glycol amount is too low, the copper oxide nanopowder cannot be efficiently dispersed. If the polyethylene glycol amount is too high, the thermal conductivity will be lowered. In some embodiments, the epoxy resin can be bisphenol F type (BPF) epoxy resin.

In some embodiments, the aqueous resin and the copper oxide nanopowder have a weight ratio of 20:80 to 18:82. If the copper oxide nanopowder amount is too low, the electrically insulating and thermally conductive film will have an insufficient thermal conductivity. If the copper oxide nanopowder amount is too high, the film material will be not uniform due to its overly high viscosity.

In some embodiments, the polyethylene glycol has a weight average molecular weight of 300 to 600. If the weight average molecular weight of the polyethylene glycol is too small, it will be difficult to form a steric structure between the copper oxide nanopowder to hinder the aggregation of the copper oxide nanopowder. If the weight average molecular weight of the polyethylene glycol is too large, the polyethylene glycol will be semi-solid state and cannot be easily uniformly dispersed in the aqueous resin.

In some embodiments, the electrically insulating and thermally conductive film has a thickness of 8 micrometers to 15 micrometers. If the electrically insulating and thermally conductive film is too thin, an efficiently electrically insulation may not be achieved. If the electrically insulating and thermally conductive film is too thick, the 3D IC package is difficult to be thinner.

Below, exemplary embodiments will be described in detail so as to be easily realized by a person having ordinary knowledge in the art. The inventive concept may be embodied in various forms without being limited to the exemplary embodiments set forth herein.

EXAMPLES

In following Examples, the thermal conductivity, thermal diffusivity, and specific heat of the films were directly measured by hot disk ISO22007-2 transient plane heat source method (TPS) according to ASTM D792. The breaking voltage of the films was measured according to ASTM D1816.

Example 1

An aqueous solution of 1 M of hydrochloric acid was used to dissolve copper metal bulks of different sizes (>99.5 wt %) to form 1 wt %, 2 wt %, 4 wt %, and 6 wt % of copper-containing solutions (with a pH value of 2), respectively. 0.1 M of sodium hydroxide aqueous solution (pH>12) was slowly and dropwise added to the copper-containing solution, and the solution was evenly stirred using a stirring bar (200 rpm). Once the solid was no longer precipitated, the solid was filtered and collected. The precipitate was washed with water until the pH value of the filtrate was about 7. The white filtered cake was baked dry at 80° C. for 2 hours. The filtered cake was calcinated at 500° C. for 4 hours to obtain black copper oxide nanopowder. The copper oxide nanopowder was checked by SEM. The ball-shaped copper oxide nanopowder formed from the 1 wt % of copper-containing solution had a diameter of 30 nm to 60 nm. The ball-shaped copper oxide nanopowder formed from the 2 wt % of copper-containing solution had a diameter of 60 nm to 100 nm. The ball-shaped copper oxide nanopowder formed from the 4 wt % of copper-containing solution had a diameter of 40 nm to 150 nm. The ball-shaped copper oxide nanopowder formed from the 6 wt % of copper-containing solution had a diameter of 80 nm to 200 nm. Because the ball-shaped copper oxide nanopowder formed from the 1 wt % of copper-containing solution had the smallest diameter and the most uniform diameter, the following Examples selected the 1 wt % of copper-containing solution to prepare the copper oxide nanopowder.

Example 2-1

An aqueous solution of 1 M of sulfuric acid was used to dissolve a copper metal bulk (>99.5 wt %) to form 1 wt % of copper-containing solution (with a pH value of 2). 0.1 M of sodium hydroxide aqueous solution (pH>12) was slowly and dropwise added to the copper-containing solution, and the solution was evenly stirred using a stirring bar (200 rpm). Once the solid was no longer precipitated, the solid was filtered and collected. The precipitate was washed with water until the pH value of the filtrate was about 7. The white filtered cake was baked dry at 80° C. for 2 hours. The filtered cake was calcinated at 500° C. for 4 hours to obtain black copper oxide nanopowder. The copper oxide nanopowder was a combination of long-bar shaped and sheet shaped. The copper oxide nanopowder was checked by SEM. The long-bar shaped copper oxide nanopowder had a length-to-diameter ratio of 25 to 100 and a diameter of 50 nm to 200 nm. The sheet shaped copper oxide nanopowder had a length-to-thickness ratio of 25 to 100 and a thickness of 50 nm to 200 nm.

Example 2-2

An aqueous solution of 1 M of nitric acid was used to dissolve a copper metal bulk (>99.5 wt %) to form 1 wt % of copper-containing solution (with a pH value of 2). 0.1 M of sodium hydroxide aqueous solution (pH>12) was slowly and dropwise added to the copper-containing solution, and the solution was evenly stirred using a stirring bar (200 rpm). Once the solid was no longer precipitated, the solid was filtered and collected. The precipitate was washed with water until the pH value of the filtrate was about 7. The white filtered cake was baked dry at 80° C. for 2 hours. The filtered cake was calcinated at 500° C. for 4 hours to obtain black copper oxide nanopowder. The copper oxide nanopowder was short-bar shaped. The copper oxide nanopowder was checked by SEM. The short-bar shaped copper oxide nanopowder had a length-to-diameter ratio of 5 to 20 and a diameter of 50 nm to 200 nm.

Example 3

92 parts by weight of the epoxy resin LLF-160U (BPF epoxy resin commercially available from Gun Ei Chemical Industry Co., Ltd.), 7 parts by weight of the vinyl silane GY-S-1120 commercially available from Merck, and 1 part by weight of the polyethylene glycol PEG-600 (having a weight average molecular weight of 600) commercially available from Dow Chemical were mixed to form an aqueous resin. 75 parts by weight of the copper oxide nanopowder in Example 2-1 (the combination of long-bar shaped and sheet shaped) and 25 parts by weight of the aqueous resin were mixed to form a film material a. The film material a had a thermal conductivity of 1.89 W/m*K.

92 parts by weight of the epoxy resin LLF-160U, 6 parts by weight of the vinyl silane GY-S-1120, and 2 parts by weight of the polyethylene glycol PEG-600 were mixed to form an aqueous resin. 75 parts by weight of the copper oxide nanopowder in Example 2-1 (the combination of long-bar shaped and sheet shaped) and 25 parts by weight of the aqueous resin were mixed to form a film material b. The film material b had a thermal conductivity of 1.97 W/m*K.

94 parts by weight of the epoxy resin LLF-160U, 5 parts by weight of the vinyl silane GY-S-1120, and 1 part by weight of the polyethylene glycol PEG-600 were mixed to form an aqueous resin. 75 parts by weight of the copper oxide nanopowder in Example 2-1 (the combination of long-bar shaped and sheet shaped) and 25 parts by weight of the aqueous resin were mixed to form a film material c. The film material c had a thermal conductivity of 2.14 W/m*K.

94 parts by weight of the epoxy resin LLF-160U, 4 parts by weight of the vinyl silane GY-S-1120, and 2 parts by weight of the polyethylene glycol PEG-600 were mixed to form an aqueous resin. 75 parts by weight of the copper oxide nanopowder in Example 2-1 (the combination of long-bar shaped and sheet shaped) and 25 parts by weight of the aqueous resin were mixed to form a film material d. The film material d had a thermal conductivity of 2.34 W/m*K.

96 parts by weight of the epoxy resin LLF-160U, 3 parts by weight of the vinyl silane GY-S-1120, and 1 part by weight of the polyethylene glycol PEG-600 were mixed to form an aqueous resin. 75 parts by weight of the copper oxide nanopowder in Example 2-1 (the combination of long-bar shaped and sheet shaped) and 25 parts by weight of the aqueous resin were mixed to form a film material e. The film material e had a thermal conductivity of 2.25 W/m*K.

96 parts by weight of the epoxy resin LLF-160U, 2 parts by weight of the vinyl silane GY-S-1120, and 2 parts by weight of the polyethylene glycol PEG-600 were mixed to form an aqueous resin. 75 parts by weight of the copper oxide nanopowder in Example 2-1 (the combination of long-bar shaped and sheet shaped) and 25 parts by weight of the aqueous resin were mixed to form a film material f. The film material f had a thermal conductivity of 2.18 W/m*K.

As known above, the film material d had the highest thermal conductivity, such that the formula of its aqueous resin was selected to prepare the following film materials.

Example 4

94 parts by weight of the epoxy resin LLF-160U, 4 parts by weight of the vinyl silane GY-S-1120, and 2 parts by weight of the polyethylene glycol PEG-600 were mixed to form an aqueous resin.

70 parts by weight of the copper oxide nanopowder in Example 2-1 (the combination of long-bar shaped and sheet-shaped) and 30 parts by weight of the aqueous resin were mixed to form a film material a. The film material a had a thermal conductivity of 1.78 W/m*K.

75 parts by weight of the copper oxide nanopowder in Example 2-1 (the combination of long-bar shaped and sheet-shaped) and 25 parts by weight of the aqueous resin were mixed to form a film material b. The film material b had a thermal conductivity of 2.34 W/m*K.

80 parts by weight of the copper oxide nanopowder in Example 2-1 (the combination of long-bar shaped and sheet-shaped) and 20 parts by weight of the aqueous resin were mixed to form a film material c. The film material c had a thermal conductivity of 3.25 W/m*K.

82 parts by weight of the copper oxide nanopowder in Example 2-1 (the combination of long-bar shaped and sheet-shaped) and 18 parts by weight of the aqueous resin were mixed to form a film material d. The film material d had a thermal conductivity of 3.34 W/m*K.

83 parts by weight of the copper oxide nanopowder in Example 2-1 (the combination of long-bar shaped and sheet-shaped) and 17 parts by weight of the aqueous resin were mixed to form a film material, which was not uniform due to its overly high viscosity.

Example 5

94 parts by weight of the epoxy resin LLF-160U, 4 parts by weight of the vinyl silane GY-S-1120, and 2 parts by weight of the polyethylene glycol PEG-600 were mixed to form an aqueous resin.

82 parts by weight of the copper oxide nanopowder in Example 2-1 (the combination of long-bar shaped and sheet-shaped) and 18 parts by weight of the aqueous resin were mixed to form a film material a. The film material a had a thermal conductivity of 3.34 W/m*K, a density of 3.72 $g/cm^3$, a specific heat of 0.54 J/g*K, a thermal diffusivity of 1.46 $mm^2/s$.

82 parts by weight of the copper oxide nanopowder in Example 2-2 (the short-bar shaped) and 18 parts by weight of the aqueous resin were mixed to form a film material b. The film material b had a thermal conductivity of 3.07 W/m*K, a density of 3.73 $g/cm^3$, a specific heat of 0.53 J/g*K, a thermal diffusivity of 1.58 $mm^2/s$.

82 parts by weight of the copper oxide nanopowder in Example 1 (the ball-shaped, having a diameter of 30 nm to 60 nm) and 18 parts by weight of the aqueous resin were mixed to form a film material c. The film material c had a thermal conductivity of 1.35 W/m*K, a density of 3.59 g/cm$^3$, a specific heat of 0.52 J/g*K, a thermal diffusivity of 0.73 mm$^2$/s.

Compared to the ball-shaped copper oxide nanopowder, the combination of the long-bar shaped and the sheet shaped copper oxide nanopowder and the short-bar shaped copper oxide nanopowder may further enhance the thermal conductivity of the film material, as known from above.

Example 6

94 parts by weight of the epoxy resin LLF-160U, 4 parts by weight of the vinyl silane GY-S-1120, and 2 parts by weight of the polyethylene glycol PEG-600 were mixed to form an aqueous resin.

82 parts by weight of the copper oxide nanopowder in Example 2-1 (the combination of long-bar shaped and sheet-shaped) and 18 parts by weight of the aqueous resin were mixed to form a film a (having a thickness of 13±1 micrometers). The film a had a thermal conductivity of 2.762 W/m*K, which is higher than the thermal conductivity (0.766 W/m*K) of the commercially available alumina attach film (having a thickness of 60 micrometers).

82 parts by weight of the copper oxide nanopowder in Example 2-1 (the combination of long-bar shaped and sheet-shaped) and 18 parts by weight of the aqueous resin were mixed to form a film b (having a thickness of 520 micrometers). The film b had a thermal conductivity of 3.283 W/m*K, a breaking voltage of 15.04 kV, and a dielectric strength of 28.91 kV/mm. The commercially available alumina attach film (having a thickness of 540 micrometers) had a breaking voltage of 14.99 kV and a dielectric strength of 27.92 kV/mm. Accordingly, the film containing the copper oxide nanopowder in Example had an excellent electrical insulation.

Example 7

94 parts by weight of the epoxy resin LLF-160U, 4 parts by weight of the vinyl silane GY-S-1120, and 2 parts by weight of the polyethylene glycol PEG-600 were mixed to form an aqueous resin. 82 parts by weight of the copper oxide nanopowder in Example 2-1 (the combination of long-bar shaped and sheet-shaped) and 18 parts by weight of the aqueous resin were mixed to form a film material a. The film material a had a thermal conductivity of 3.34 W/m*K.

94 parts by weight of the epoxy resin LLF-160U, 4 parts by weight of the amino silane KBM-603 commercially available from Shin-Etsu Chemical Co., Ltd., and 2 parts by weight of the polyethylene glycol PEG-600 were mixed to form an aqueous resin. 82 parts by weight of the copper oxide nanopowder in Example 2-1 (the combination of long-bar shaped and sheet-shaped) and 18 parts by weight of the aqueous resin were mixed to form a film material b. The film material b had a thermal conductivity of 2.47 W/m*K. As known from the film material b, not all silane is suitable for forming a thermal conductive film.

94 parts by weight of the epoxy resin LLF-160U, 4 parts by weight of the methacryloxysilane Z-6036 commercially available from Dow Corning, and 2 parts by weight of the polyethylene glycol PEG-600 were mixed to form an aqueous resin. 82 parts by weight of the copper oxide nanopowder in Example 2-1 (the combination of long-bar shaped and sheet-shaped) and 18 parts by weight of the aqueous resin were mixed to form a film material c. The film material c had a thermal conductivity of 1.98 W/m*K. As known from the film material c, not all silane was suitable for forming a thermal conductive film.

94 parts by weight of the epoxy resin SLC-165UH commercially available from Gun Ei Chemical Industry Co., Ltd. (Blended BPF/BPA epoxy resin), 4 parts by weight of the vinyl silane GT-S-1120, and 2 parts by weight of the polyethylene glycol PEG-600 were mixed to form an aqueous resin. 82 parts by weight of the copper oxide nanopowder in Example 2-1 (the combination of long-bar shaped and sheet-shaped) and 18 parts by weight of the aqueous resin were mixed to form a film material d. The film material d had a thermal conductivity of 1.59 W/m*K. As known from the film material d, BPA epoxy resin could lower the thermal conductivity of the thermal conductive film.

94 parts by weight of the epoxy resin SLC-165UH, 4 parts by weight of the amino silane KBM-603, and 2 parts by weight of the polyethylene glycol PEG-600 were mixed to form an aqueous resin. 82 parts by weight of the copper oxide nanopowder in Example 2-1 (the combination of long-bar shaped and sheet-shaped) and 18 parts by weight of the aqueous resin were mixed to form a film material e. The film material e had a thermal conductivity of 0.98 W/m*K. As known from the film material e, not all silane was suitable for forming a thermal conductive film, and BPA epoxy resin could lower the thermal conductivity of the thermal conductive film.

94 parts by weight of the epoxy resin SLC-165UH, 4 parts by weight of the methacryloxysilane Z-6036, and 2 parts by weight of the polyethylene glycol PEG-600 were mixed to form an aqueous resin. 82 parts by weight of the copper oxide nanopowder in Example 2-1 (the combination of long-bar shaped and sheet-shaped) and 18 parts by weight of the aqueous resin were mixed to form a film material f. The film material f had a thermal conductivity of 1.25 W/m*K. As known from the film material f, not all silane was suitable for forming a thermal conductive film, and BPA epoxy resin could lower the thermal conductivity of the thermal conductive film.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of forming copper oxide nanopowder, comprising:

dissolving copper metal bulk in an acidic solution to form a copper-containing solution, wherein the acidic solution comprises sulfuric acid or nitric acid, adding an alkaline solution into the copper-containing solution to precipitate a solid, filtering, collecting, and drying the solid; and calcinating the solid to obtain copper oxide nanopowder, wherein when the acidic solution is sulfuric acid, the copper oxide nanopowder is a combination of long-bar shaped and sheet-shaped; and when the acidic solution is nitric acid, the copper oxide nanopowder is short-bar shaped, wherein the short-bar shaped copper oxide nanopowder has a length-to-diameter ratio of 5 to 20 and a diameter of 50 nm to 200 nm.

2. The method as claimed in claim 1, wherein the long-bar shaped copper oxide nanopowder has a length-to-diameter ratio of 25 to 100 and a diameter of 50 nm to 200 nm.

3. The method as claimed in claim 1, wherein the sheet-shaped copper oxide nanopowder has a length-to-thickness ratio of 25 to 100 and a thickness of 50 nm to 200 nm.

4. The method as claimed in claim 1, wherein the alkaline solution is 0.05 M to 0.5 M of sodium hydroxide solution.

* * * * *